United States Patent
Close

(10) Patent No.: US 10,618,443 B2
(45) Date of Patent: Apr. 14, 2020

(54) METHOD AND APPARATUS THAT ADJUST AUDIO OUTPUT ACCORDING TO HEAD RESTRAINT POSITION

(71) Applicant: GM GLOBAL TECHNOLOGY OPERATIONS LLC, Detroit, MI (US)

(72) Inventor: Richard A. Close, Farmington Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 133 days.

(21) Appl. No.: 15/886,160

(22) Filed: Feb. 1, 2018

(65) Prior Publication Data

US 2019/0232840 A1    Aug. 1, 2019

(51) Int. Cl.
*B60N 2/879* (2018.01)
*B60N 2/806* (2018.01)
*B60N 2/885* (2018.01)
*B60R 11/00* (2006.01)

(52) U.S. Cl.
CPC .............. *B60N 2/879* (2018.02); *B60N 2/806* (2018.02); *B60N 2/885* (2018.02); *B60R 2011/0017* (2013.01)

(58) Field of Classification Search
CPC .. A47C 7/72; B60N 2002/0272; B60N 2/879; B60N 2/806; B60N 2/885; B60R 11/0217; B60R 2011/0017; H04R 5/023; H04R 2499/13; B64D 11/06; B64D 11/0624; B64D 11/0015
USPC .......................... 381/300, 301, 302, 304, 305
See application file for complete search history.

(56) References Cited

U.S. PATENT DOCUMENTS

| | | | |
|---|---|---|---|
| 7,684,577 B2* | 3/2010 | Arai | A47C 7/72 381/302 |
| 8,483,413 B2* | 7/2013 | Hartung | H04R 5/02 381/302 |
| 9,769,581 B1* | 9/2017 | Oswald | H04R 29/001 |
| 2006/0119572 A1* | 6/2006 | Lanier | G06F 1/1601 345/156 |
| 2015/0289050 A1* | 10/2015 | Butler | G10K 11/22 381/387 |
| 2016/0100250 A1* | 4/2016 | Baskin | H04R 1/02 297/217.4 |
| 2016/0286316 A1* | 9/2016 | Bleacher | B60R 11/0217 |

* cited by examiner

*Primary Examiner* — William A Jerez Lora

(57) ABSTRACT

A method and apparatus that adjust audio output are provided. The method includes detecting a position of a wing of a headrest, adjusting an audio signal based on the detected position of the wing of the headrest, and outputting the adjusted audio signal.

16 Claims, 3 Drawing Sheets

METHOD AND APPARATUS THAT ADJUST AUDIO OUTPUT ACCORDING TO HEAD RESTRAINT POSITION

INTRODUCTION

Apparatuses and methods consistent with exemplary embodiments relate to optimizing or adjusting audio outputs. More particularly, apparatuses and methods consistent with exemplary embodiments relate to optimizing an audio output signal based on a position of an audio device.

SUMMARY

One or more exemplary embodiments provide a method and an apparatus that adjust an audio output signal based on a position of a speaker and reproduce the adjusted output signal. More particularly, one or more exemplary embodiments provide a method and an apparatus that adjust an audio output signal based on a position of headrest wing detected by wing position sensor and reproduce the adjusted output signal.

According to an aspect of an exemplary embodiment, a method for adjusting audio output is provided. The method includes detecting a position of a wing of a headrest, adjusting an audio signal based on the detected position of the wing of the headrest, and outputting the adjusted audio signal. The method may also include receiving the audio signal.

The outputting the adjusted audio signal may include reproducing the adjusted audio signal at a speaker. The speaker may be disposed in the wing of the headrest.

The detecting the position of the wing of the headrest may include detecting the position of the wing along an axis of rotation or detecting a linear travel distance.

The outputting the adjusted audio signal may include outputting a noise cancellation signal.

The method may also include determining a position of speaker based on based on the detected position of the wing of the headrest and adjusting the audio signal based on the determined position of the speaker.

The detecting the position may include detecting a value from at least one from among a potentiometer, an encoder, a switch, and a proximity sensor.

The adjusting an audio signal based on the detected position of the wing of the headrest may include calculating the adjusted audio signal based on a transfer function that applies a value corresponding to detected position of the wing of the headrest to a value corresponding to an input audio signal.

According to an aspect of exemplary embodiment, an apparatus adjusts audio output is provided. The apparatus includes a position sensor configured to detect a position of a wing of a headrest and output the detected position; at least one memory comprising computer executable instructions; and at least one processor configured to read and execute the computer executable instructions. The computer executable instructions may cause the at least one processor to control to adjust an audio signal based on the detected position of the wing of the headrest and output the adjusted audio signal. The apparatus may also include an audio input configured to provide the audio signal to the at least one processor.

The apparatus may also include a speaker configured to reproduce the adjusted audio signal. The speaker may be disposed in the wing of the headrest.

The apparatus may include the headrest including the wing and the speaker, and the position sensor may be disposed in the headrest or the wing.

The wing may adjustable such that it rotates on an axis that intersects a top of the headrest.

The position sensor may be configured to detect the position of the wing along an axis of rotation or a linear travel distance.

The adjusted audio signal may include a noise cancellation signal.

The computer executable instructions may cause the at least one processor to determine a position of speaker based on based on the detected position of the wing of the headrest and control to adjust audio signal based on the determined position of the speaker.

The sensor may be at least one from among a potentiometer, an encoder, a switch, and a proximity sensor.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
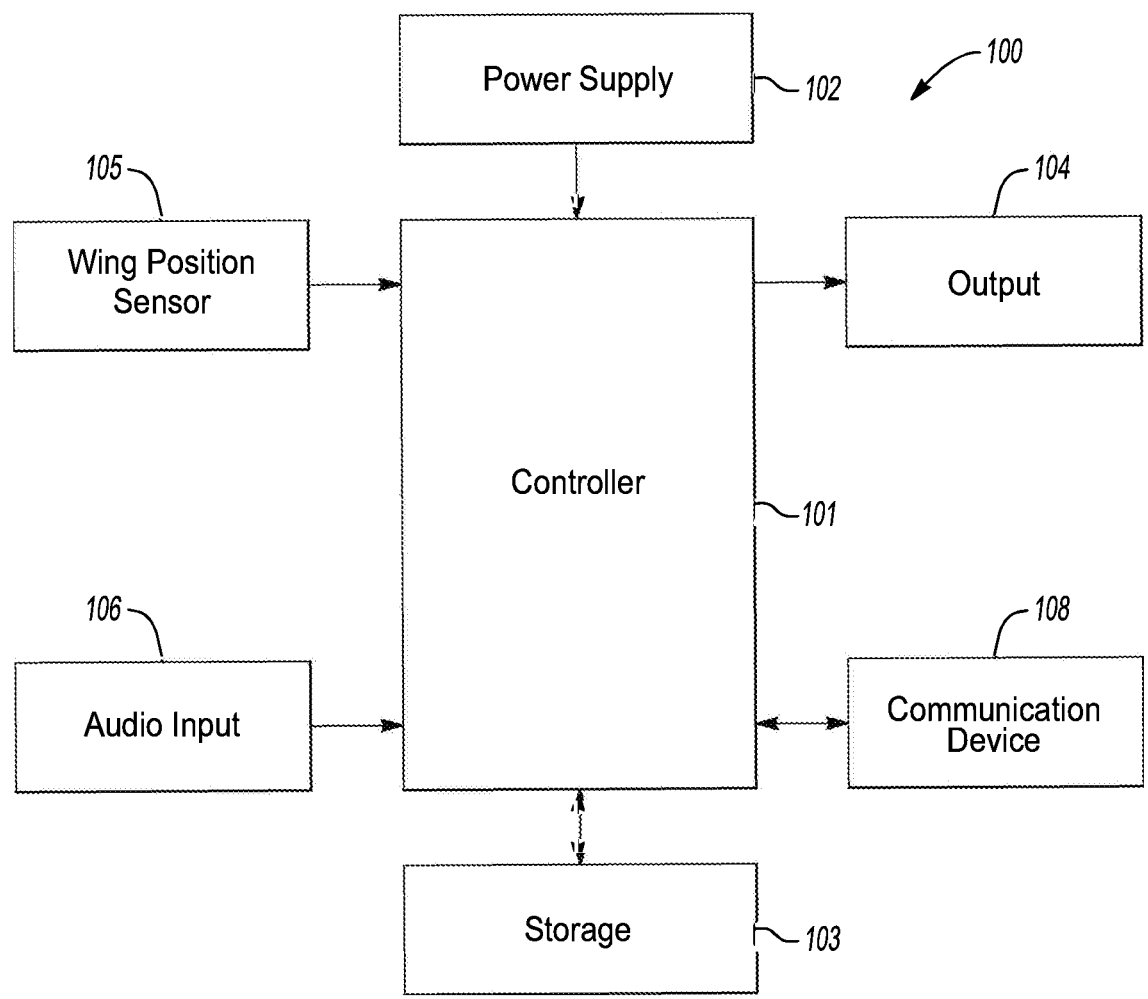
FIG. 1 shows a block diagram of an apparatus that adjusts audio output according to an exemplary embodiment.

An apparatus and method and apparatus that adjust audio output will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Speakers may be placed in various places inside of a vehicle with the goal of optimizing the audio or noise cancellation experienced by a passenger of the vehicle. For example, speakers may be placed in a seat, head restraint or headrest of a seat of a vehicle such as an automobile, train, truck, or other passenger seating system. In this example, a speaker may be placed in one or more comfort wings of a headrest or head restraint.

The speakers may be mounted to the wing substrate with an acoustically transparent covering. The substrate may also form enclosure for the speaker acoustic envelope. The enclosure may be a two chamber design with part of the enclosure residing in the main portion of the head restraint. In a two chamber design, the two chambers would be connected with a flexible baffle to allow the adjustable wing to move. The wings may be adjustable to direct sound towards a listener's or occupant's ears and away from an adjacent occupant or seat to improve passive attenuation and enable improved zone audio performance.

FIG. 1 shows a block diagram of an apparatus that adjusts audio output 100 according to an exemplary embodiment. As shown in FIG. 1, the apparatus that adjusts audio output 100, according to an exemplary embodiment, includes a controller 101, a power supply 102, a storage 103, an output 104, a wing position sensor 105, an audio input 106, and a communication device 108. However, the apparatus that adjusts audio output 100 is not limited to the aforementioned configuration and may be configured to include additional elements and/or omit one or more of the aforementioned elements. The apparatus that adjusts audio output 100 may be implemented as part of a vehicle, as a standalone component, as a hybrid between an on vehicle and off vehicle device, or in another computing device.

The controller 101 controls the overall operation and function of the apparatus that adjusts audio output 100. The controller 101 may control one or more of a storage 103, an output 104, a wing position sensor 105, an audio input 106, and a communication device 108 of the apparatus that adjusts audio output 100. The controller 101 may include one or more from among a processor, a microprocessor, a central processing unit (CPU), an audio processor, Application Specific Integrated Circuits (ASICs), Field-Programmable Gate Arrays (FPGAs), state machines, circuitry, and a combination of hardware, software and firmware components.

The controller 101 is configured to control the audio output based on the wing position information. For example, the controller may control an amplifier output to drive the audio output from one or more speakers of the output 104 to the intended listener's ears and away from adjacent seats.

The controller 101 may be configured to send and/or receive information from one or more of the storage 103, the output 104, the wing position sensor 105, the audio input 106, and the communication device 108 of the apparatus that adjusts audio output 100. The information may be sent and received via a bus or network, or may be directly read or written to/from one or more of the storage 103, the output 104, the wing position sensor 105, the audio input 106, and the communication device 108 of the apparatus that adjusts audio output 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet or an Analog Devices A2B network.

The power supply 102 provides power to one or more of the controller 101, the storage 103, the output 104, the wing position sensor 105, the audio input 106, and the communication device 108, of the apparatus that adjusts audio output 100. The power supply 102 may include one or more from among a battery, an outlet, a capacitor, a solar energy cell, a generator, a wind energy device, an alternator, etc.

The storage 103 is configured for storing information and retrieving information used by the apparatus that adjusts audio output 100. The storage 103 may be controlled by the controller 101 to store information received from the wing position sensor 105, audio input 106, and communication device 108, and to retrieve the stored information. The storage may store audio information, transfer function, audio tuning information, wing position information, etc. In addition, the storage 103 may also include the computer instructions configured to be executed by a processor to perform the functions of the apparatus that adjusts audio output 100.

Audio tuning information may include tuning parameters such as equalization values of a speaker, a time delay, poles, a speaker's q value (e.g., the resonant peak's center frequency divided by the peak's bandwidth), or other tuning parameters based on speaker position. Audio information is information used to reproduce a sound at the output 104. A transfer function may adjust audio information to reproduce an adjusted audio output signal or audio information. The transfer function may apply a value corresponding to detected position of the wing of the headrest to a value from the audio information corresponding to an input audio signal and produce an adjusted audio information value. Wing position information may be a position of a wing relative to a headrest or an axis that intersects the top or bottom of the headrest.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 may be one or more from among a speaker, a transducer, or an amplifier that converts the information or signal provided by controller 101 into an audio output or noise cancellation output.

The audio input 106 is configured to provide audio information in the form of a digital information or an audio signal to the apparatus that adjusts audio output 100. The audio input 106 may be a microphone, a line in, a storage device containing audio information, etc.

The wing position sensor 105 may be configured to detect a position of a wing of headrest or head restraint of a seat (e.g., a vehicle seat). The wing position sensor 105 may be one or more from among a potentiometer, an encoder, a switch, a proximity sensor, or other such device that would communicate a position the wing to the controller 101. The wing position sensor 105 may be configured to detect the position of the wing along an axis perpendicular to or that intersects the top of the headrest.

The communication device 108 may be used by apparatus that adjusts audio output 100 to communicate with various types of external apparatuses according to various communication methods. The communication device 108 may be used to send/receive audio information, a transfer function information, audio tuning information, wing position information, etc.

The communication device 108 may include various communication modules such as one or more from among a telematics unit, a broadcast receiving module, a near field communication (NFC) module, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), A2B wired network, or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an example, the controller 101 of the apparatus that adjusts audio output 100 may be configured to control to adjust an audio signal based on the detected position of the wing of the headrest and output the adjusted audio signal. In addition, the controller 101 of the apparatus that adjusts audio output 100 may be configured to receive the audio signal from an audio input device.

According to an example, the controller 101 of the apparatus that adjusts audio output 100 may be configured to determine a position of speaker based on based on the detected position of the wing of the headrest and control to adjust audio signal based on the determined position of the speaker.

According to an example, the controller 101 of the apparatus that adjusts audio output 100 may be configured to calculate the adjusted audio signal based on a transfer function that applies a value corresponding to detected position of the wing of the headrest to a value corresponding to an input audio signal. The controller 101 may adjust the audio signal by adjusting of equalization values of a speaker, a time delay, poles, a speaker's q value (e.g., the resonant peak's center frequency divided by the peak's bandwidth), or other tuning parameters based on speaker position.

Figure 2:
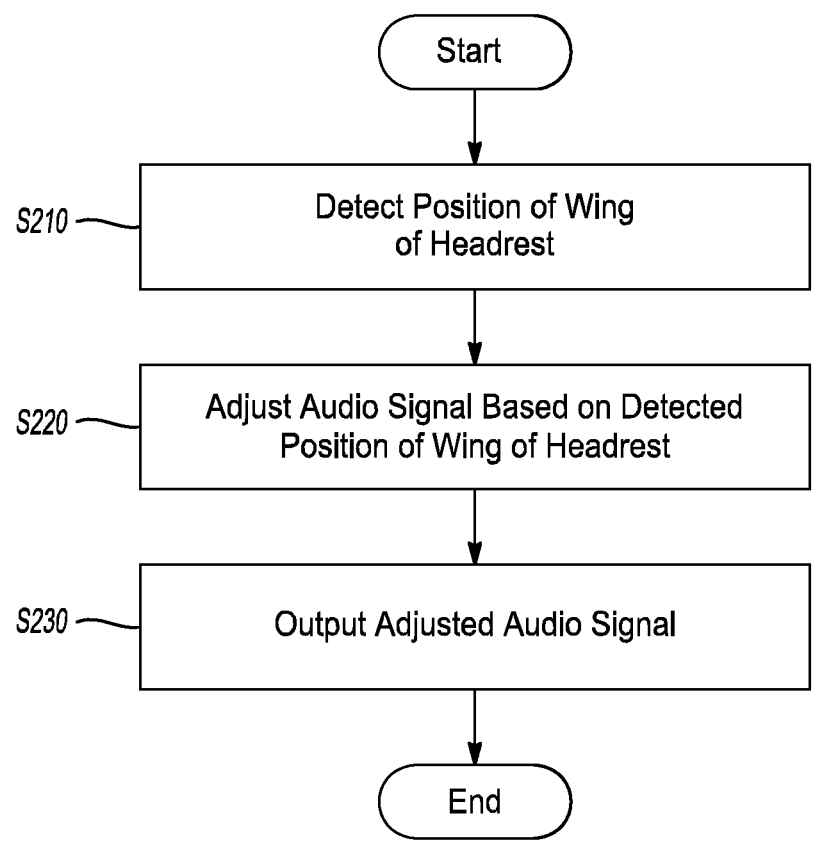
FIG. 2 shows a flowchart for a method adjusting audio output according to an exemplary embodiment.

FIG. 2 shows a flowchart for a method adjusting audio output according to an exemplary embodiment. The method of FIG. 2 may be performed by the apparatus that adjusts audio output 100 or may be encoded into a computer readable medium as instructions that are executable by a computer to perform the method.

Referring to FIG. 2, a position of a wing of headrest is detected in operation S210. The position may be detected by a wing position sensor 105 or information output by wing position sensor 105 may be used to detect the position of the wing of the headrest.

In operation S220, an audio signal is adjusted based on the detected of the wing of the headset. In this operation, the audio signal may be a noise cancellation signal or an audible signal that is to be reproduced by output 105. The adjusting the audio signal may be performed by applying a transfer function to audio information and the transfer function may adjust the audio information according to one or more from among wing position information, a seat location (e.g., passenger, driver, etc.), and a wing location with respect to the seat (e.g., right, left, etc.).

The adjusting the audio signal may also include an adjustment of equalization values of a speaker, a time delay, poles, a speaker's q value (e.g., the resonant peak's center frequency divided by the peak's bandwidth), or other tuning parameters based on speaker position.

In operation S230, the adjusted audio signal is output by output 105. In this operation, the adjusted audio signal may be reproduced by one or more speakers disposed in one or more wings of headrest or head restraints in a vehicle.

Figure 3:
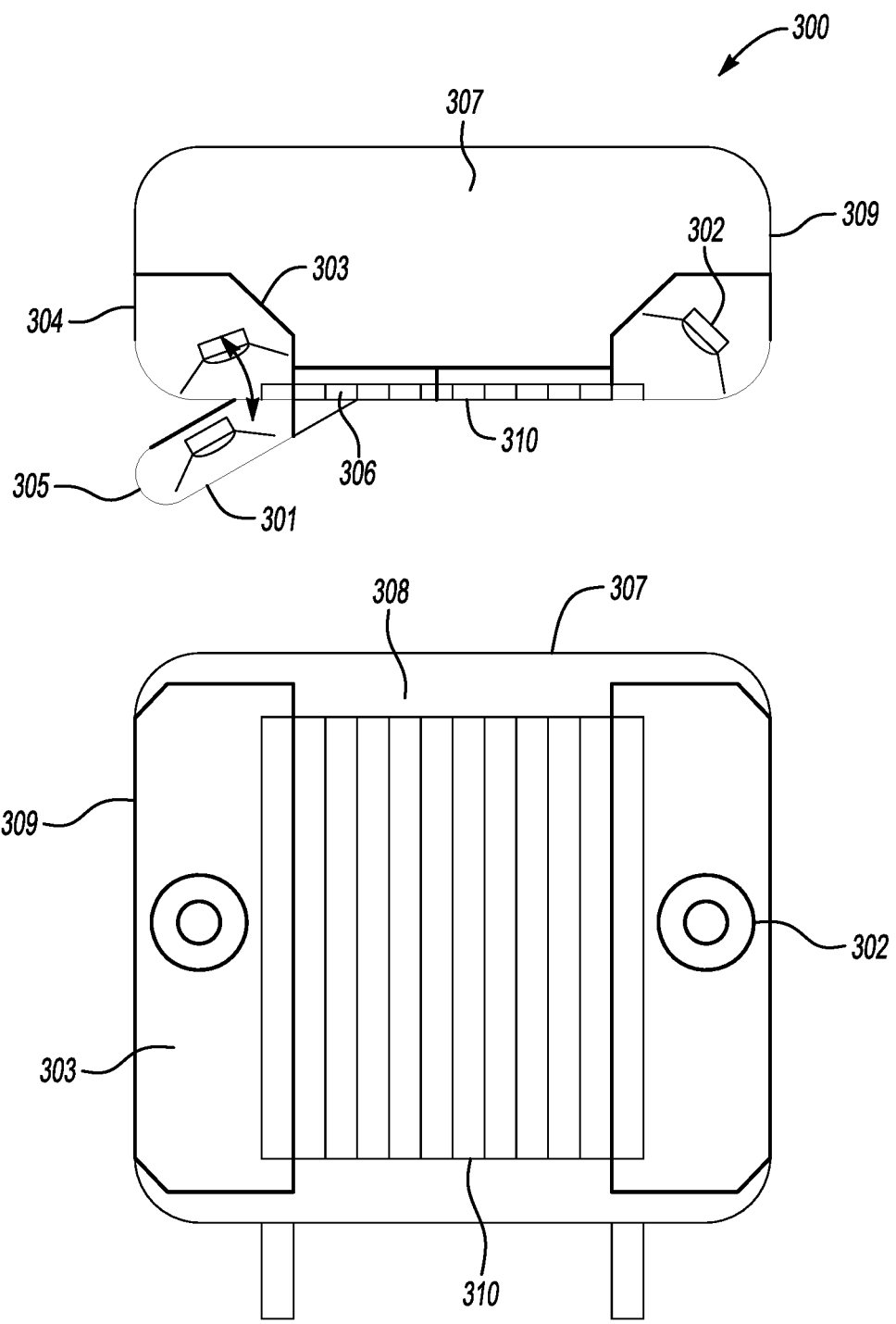
FIG. 3 shows an illustration of an adjustable wing of a headrest seat including a position sensor according to an aspect of an exemplary embodiment.

FIG. 3 shows an illustration of an adjustable wing of a headrest seat including a position sensor 306 according to an aspect of an exemplary embodiment.

Referring to FIG. 3, a headrest 300 or head restraint of a seat is shown. The headrest 300 may include one or more wings 301 that each may comprise one or more speakers 302 disposed in an enclosure 303 of a wing 301. Each wing 301 may also include a rigid grille portion 304 and a flexible or soft grille portion 305. The rigid grille portion 304 is disposed on a side 309 of the headrest and configured to provide support for the face 308 of the headrest 301 including the flexible grille portion 305. Both the rigid grille portion 304 and a flexible or soft grille portion 305 are configured to pass sound from a speaker 302 through an acoustically transparent covering.

One or more position sensors 306 may be attached to the headrest 300, flexible baffle 310 or soft grille portion 305. The position sensors 306 may be configured to detect the position of the wings 301 with respect to the headrest 300.

In one example, the enclosures 303 may be a two chamber design with part of the enclosure residing in the main portion of the headrest 300. In a two chamber design, the two chambers would be connected with a flexible baffle 310 to allow the adjustable wings 301 to move.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for adjusting audio output, the method comprising:

detecting a position of a wing of a headrest;

adjusting an audio signal and a noise cancellation signal based on the detected position of the wing of the headrest; and outputting the adjusted audio signal and the adjusted noise cancellation signal, wherein the adjusting an audio signal based on the detected position of the wing of the headrest comprises calculating the adjusted audio signal and the adjusted noise cancellation signal based on a transfer function that applies a value corresponding to detected position of the wing of the headrest to a value corresponding to an input audio signal.

2. The method of claim 1, further comprising receiving the audio signal.

3. The method of claim 1, wherein the outputting the adjusted audio signal comprises reproducing the adjusted audio signal at a speaker.

4. The method of claim 3, wherein the speaker is disposed in the wing of the headrest.

5. The method of claim 1, wherein the detecting the position of the wing of the headrest comprises detecting the position of the wing along an axis of rotation or detecting a linear travel distance.

6. The method of claim 1, further comprising:
determining a position of speaker based on the detected position of the wing of the headrest; and
adjusting the audio signal based on the determined position of the speaker.

7. The method of claim 1, wherein the detecting the position comprises detecting a value from at least one from among a potentiometer, an encoder, a switch, and a proximity sensor.

8. A non-transitory computer readable medium comprising computer executable instructions executable by a processor to perform the method of claim 1.

9. An apparatus that adjusts audio output, the apparatus comprising:
a position sensor configured to detect a position of a wing of a headrest and output the detected position;
at least one memory comprising computer executable instructions; and
at least one processor configured to read and execute the computer executable instructions, the computer executable instructions causing the at least one processor to determine a position of speaker based on the detected position of the wing of the headrest, adjust an audio signal and a noise cancellation signal based on the detected position of the wing of the headrest and output the adjusted audio signal and the adjusted noise cancellation signal, wherein the computer executable instructions cause the at least one processor to adjust an audio signal based on the detected position of the wing of the headrest by calculating the adjusted audio signal and the adjusted noise cancellation signal based on a transfer function that applies a value corresponding to detected position of the wing of the headrest to a value corresponding to an input audio signal.

10. The apparatus of claim 9, further comprising an audio input configured to provide the audio signal to the at least one processor.

11. The apparatus of claim 10, further comprising a speaker configured to reproduce the adjusted audio signal.

12. The apparatus of claim 11, wherein the speaker is disposed in the wing of the headrest.

13. The apparatus of claim 12, further comprising the headrest including the wing and the speaker,
wherein the position sensor is disposed in the headrest or the wing.

14. The apparatus of claim 13, wherein the wing is adjustable such that it rotates on an axis that intersects a top of the headrest.

15. The apparatus of claim 14, wherein the position sensor is configured to detect the position of the wing along an axis of rotation or a linear travel distance.

16. The apparatus of claim 9, wherein the sensor comprises at least one from among a potentiometer, an encoder, a switch, and a proximity sensor.

* * * * *